July 23, 1957 K. WINZ 2,800,209
MOTOR COUPLINGS FOR SEWING AND THE LIKE MACHINES
Filed July 23, 1954
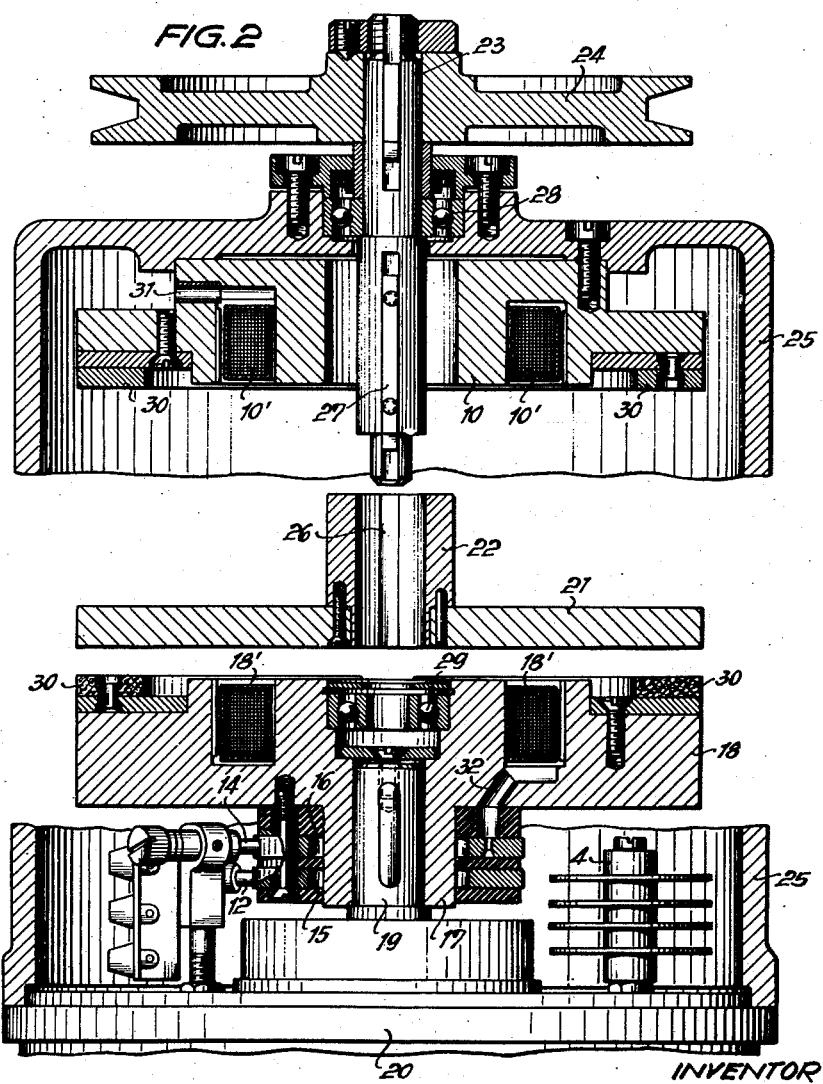
INVENTOR:
Karl WINZ United States Patent Office 2,800,209
Patented July 23, 1957

2,800,209

MOTOR COUPLINGS FOR SEWING AND THE LIKE MACHINES

Karl Winz, Kaiserslautern, Germany, assignor to G. M. Pfaff A.-G., Kaiserslautern, Pfalz, Germany, a corporation of Germany Application July 23, 1954, Serial No. 445,391

Claims priority, application Germany July 27, 1953

5 Claims. (Cl. 192—14)

The present invention relates to motor couplings for sewing and the like machines, and in particular to the coupling of motors having a constant speed with the belt pulleys of sewing or other machines.

The objects of the present invention are to render possible and to provide an uninterrupted regulation of the speed transmitted through the coupling so that a sewing machine controlled by it will in the shortest possible time reach its maximum sewing speed from a stationary condition and vice versa. Other objects are to avoid the use of a spring controlled starting rod, and to locate all parts of the coupling unit within a common housing adapted to be carried on the base plate of the sewing machine which it is required to control.

In the present invention these problems are solved by the provision of a coupling disc or the like element which is rotatable with a pulley of the machine and is located between two magnetically energisable members constituted respectively by an engaging disc or the like member fixed on a motor shaft and a stationary braking disc independent thereof, variation in the magnetic attraction exerted by said members upon the coupling disc arising from the effects of their respective magnetic fields being utilised to vary the speed of said coupling disc and pulley.

From another aspect, the present invention comprises in combination a magnetic engaging disc or the like element fixed on the shaft of a motor for the machine, a stationary magnetic braking disc independent thereof, and a coupling disc rotatable with a pulley in the transmission between the motor and the machine and located between said engaging and braking discs, said coupling disc being actuated in accordance with the effects of the magnetic fields of the respective engaging and braking discs to vary the speed of the pulley.

The voltage supplied to the magnetic engaging disc may be varied by means of a coil or a carbon pile regulator, or again an adjustable induction or capacity resistance.

Furthermore, a contact element may be fixed on the operating handle of the regulator or variable resistance which in the zero position of the starting switch bridges an interruptor of the electric supply current to the magnetic braking disc so that, at the moment of the interruption of the electric current to the magnetic engaging disc the magnetic braking disc receives the full supply pressure.

To supply the magnetic discs with electric current, either a transformer may be provided, in which case it may be mounted on the base plate of the machine opposite to the coupling side, or the stator winding may be utilised as a reserve transformer.

For a more complete understanding of the objects of the invention and how these are achieved, reference should be had to the accompanying drawings and to the following detailed description in conjunction therewith. In the drawings:

Figure 1 is a circuit diagram of the coupling.

Figure 2 is an extended view which shows a section through the coupling unit axially of the motor shaft.

In the embodiment illustrated, 1 and 2 are the electric leads to the coupling unit. The reference 3 denotes an automatic cut out, and 4 a rectifier. On a disk 5' of a regulator resistance 5 a contact piece 6 is fixed. 7 and 8 are spaced contacts for an interruption in the supply lead 9 to an immovable magnetic braking disc 10. From the rectifier 4 a lead 11 is carried to the winding 10' of a magnetic braking disc 10 as well as to a contact brush 12. The supply line for electric current to the winding 10' is directed through a bore 31 in the magnetic brake disc 10.

A lead connects the resistance 5 with a contact brush 14 of a pair of brushes 12 and 14 which are adapted for operative contact with slip rings 15 and 16 on a hub 17 of a magnetic engaging disc 18 which is provided with winding 18', and is mounted on a shaft 19 of a motor 20. The electric connecting leads from the slip rings 15, 16 to the winding 18' are led through a bore 32 in the magnetic engaging disc 18.

The electric leads 9, 11, and 13 together with the automatic cut out 3 and the regulating resistance 5 and its associated contact piece 6 and contacts 7 and 8 are shown only in Figure 1.

Between the magnetic brake disc 10 and the magnetic engagement disc 18, each of which is provided with a friction lining 30, there is located a coupling disc 21 which is attached to a bushing 22 which slides on a shaft 23 but is prevented from rotating relatively thereto by a groove 26 and spring 27. On the opposing end of the shaft 23 is fixed a belt pulley 24 which with the disc 21 constitutes the unit to be driven or braked as requirements demand. The shaft 23 is carried in ball bearings 28 and 29 in a housing 25 and rests at its end remote from the pulley 24 in the magnetic engaging disc 18. The coupling unit as a whole is located within housing 25 which forms a stationary base for the magnetic brake disc 10. The rectifier 4 is arranged in the space between the housing 25 and the slip rings 15, 16 of the magnetic engaging disc 18.

In operation the magnetic engaging disc 18 normally rotates at the constant speed of the motor 20. When however the coil 18' is energised by electric current through the infinitely variable regulating resistance 5, the magnetic field of the disc 18 operates to attract the disc 21 which is thus drawn against the disc 18 to an extent commensurate with the intensity of the field. In the result regulation of the speed of the driven coupling disc 21 and its associated belt pulley 24 of the machine is achieved. Should however the regulating resistance 5 be switched off, the contact piece 6 in zero position bridges the contacts 7, 8 whereby the coil 10' of the magnetic brake disc 10 receives the full current supply. The coupling disc 21 accordingly is attracted by the immovable magnetic brake disc 10 and practically instantaneously is brought to a standstill.

It will be understood that the drawings and foregoing description merely illustrate and identify a preferred embodiment of the present invention and that other forms may be adopted without departing from the scope of the appended claims. Accordingly such claims should not be construed as limited to the specific form of the invention described and illustrated herein.

Having thus described the invention, what I claim as new and desire to be secured by Letters Patent, is as follows:

1. In a clutch arrangement, for use in connection with the rotative driving at variable speed, and respectively, the braking of a shaft, in combination, a magnetizable disk rotatable with said shaft, electro-magnets disposed oppositely relative to said disk, said disk being slidable axially of said shaft and energizable by the magnetic field of either magnet to slide towards the energizing magnet, and friction means connected to each magnet for frictionally energizing said disk upon abutment engagement by said disk, one of said magnets being stationary, the other rotating at uniform speed, means for electrically energizing said magnets including means for varying the field of said rotating magnet to vary the force of attraction between said rotating magnet and said disk to vary the force of frictional engagement therewith.

2. In a clutch arrangement, for use in connection with the rotative driving at variable speed and, respectively, the braking of a shaft, in combination, a magnetizable disk rotatable with said shaft and being reciprocable thereon axially of said shaft, a stationary electro-magnet disposed on one side of said disk and being electrically energizable for generating a field to attract said disk in one direction towards said stationary magnet, and including means for frictionally engaging said disk during such attraction to brake the rotative momentum of said disk, and a revoluble electro-magnet rotating at uniform speed and disposed on the opposite side of said disk and being operable to be energized electrically to generate an adjustable magnetic field to attract said disk in an opposite direction towards said revolving magnet and including means for engaging said disk frictionally during such attraction in said opposite direction, the frictional force being proportional to the adjusted field, and means for electrically energizing said magnets including means for varying the field of said revoluble magnet.

3. A motor coupling as claimed in claim 2 characterized by the provision of a stator coil as an automatic transformer for the supply of electric current to the magnetic discs.

4. A motor coupling as claimed in claim 2 in which an automatic cut-out is mounted on the motor for safeguarding the current circuit of the magnetic disc.

5. A sewing machine having a motor coupling as claimed in claim 2 characterized by a transformer adapted to be mounted on the base plate of the machine on that side opposed to the coupling side, for the supply of electric current to the magnetic discs.

References Cited in the file of this patent
UNITED STATES PATENTS

| | | |
|---|---|---|
| 2,560,868 | Hubert | July 17, 1951 |
| 2,610,843 | Schellentrager | Sept. 16, 1952 |